(12) United States Patent
Deming

(10) Patent No.: US 8,240,817 B2
(45) Date of Patent: Aug. 14, 2012

(54) BONDED HOUSING AND FLUID EJECTOR

(75) Inventor: Steve Deming, San Jose, CA (US)

(73) Assignee: FUJIFILM Corporation, Tokyo (JP)

( * ) Notice: Subject to any disclaimer, the term of this patent is extended or adjusted under 35 U.S.C. 154(b) by 324 days.

(21) Appl. No.: 12/616,108

(22) Filed: Nov. 10, 2009

(65) Prior Publication Data
US 2011/0109697 A1    May 12, 2011

(51) Int. Cl.
*B41J 2/04* (2006.01)
(52) U.S. Cl. .......................................................... 347/54
(58) Field of Classification Search .................... 347/40, 347/47, 54, 56, 68
See application file for complete search history.

(56) References Cited

U.S. PATENT DOCUMENTS

| | | | |
|---|---|---|---|
| 7,404,613 B2* | 7/2008 | Kwan et al. | 347/20 |
| 8,047,630 B2* | 11/2011 | Kakuda | 347/45 |
| 2005/0243130 A1 | 11/2005 | Essen et al. | |
| 2007/0263038 A1 | 11/2007 | Bibl | |

FOREIGN PATENT DOCUMENTS

JP    2003238770 A    8/2003

OTHER PUBLICATIONS

U.S. Appl. No. 12/572,929, filed Oct. 2, 2009, 17 pages.

* cited by examiner

*Primary Examiner* — An Do
(74) *Attorney, Agent, or Firm* — Fish & Richardson P.C.

(57) ABSTRACT

A method of forming a fluid ejector includes positioning a fluid ejection module such that it is adjacent to a mounting frame, applying heat to a thermohardening glue that is between the fluid ejection module and the mounting frame, and curing the glue to secure the fluid ejection module to the mounting frame. The heat is applied with a heating element at least partially embedded in the glue.

29 Claims, 5 Drawing Sheets

BONDED HOUSING AND FLUID EJECTOR

TECHNICAL FIELD

The present disclosure relates generally to fluid ejection devices.

BACKGROUND

In some implementations of a fluid ejector, a substrate, such as a silicon substrate, includes a fluid pumping chamber, a descender, and a nozzle formed therein. Fluid droplets can be ejected from the nozzle onto a receiver, such as in a printing operation. The nozzle is fluidly connected to the descender, which is fluidly connected to the fluid pumping chamber. The fluid pumping chamber can be actuated by a transducer, such as a thermal or piezoelectric actuator, and when actuated, the fluid pumping chamber can cause ejection of a fluid droplet through the nozzle. The receiver can be moved relative to the fluid ejection device. The ejection of a fluid droplet from a nozzle can be timed with the movement of the receiver to place a fluid droplet at a desired location on the receiver.

Multiple fluid ejectors can be placed along a holder, such as a bar, which can allow for page-wide printing. It is desirable for each fluid ejector to be aligned with other fluid ejectors along the bar in order to provide uniform deposition of fluid droplets on the receiver.

SUMMARY

In general, in one aspect, a fluid ejector includes a mounting frame, a fluid ejection module attached to the mounting frame, and a conductive element at least partially embedded in the thermohardened glue. The fluid ejection module has nozzles. The glue secures the fluid ejection module to the mounting frame.

This and other embodiments can optionally include one or more of the following features. The fluid ejection module can include a die and a die cap adjacent to the die, and the glue can secure the die cap to the mounting frame. The die can include silicon. The mounting frame can include a wing structure. The mounting frame can have two wing structures, a first of which is adjacent to a first edge of the die and a second of which is adjacent to a second edge of the die opposite to the first edge. The nozzles can be formed in a surface of the die, and the surface can be substantially parallel with a surface of the wing structure. The wing structure can include plastic. The wing structure can be attached to a print bar. The glue can include an epoxy. The fluid ejector can further include a flexible element in electrical communication with the fluid ejection module such that an electrical connection of the fluid ejection module enables a signal to be sent from the flexible element to the fluid ejection module to cause fluid to be ejected from the nozzles. A first portion of the conductive element can extend along a length of the fluid ejection module. A second portion of the conductive element can extend along an entire height of the fluid ejector. The conductive element can be less than about 100μ to 200μ thick.

In general, in one aspect, a method of forming a fluid ejector includes positioning a fluid ejection module such that it is adjacent to a mounting frame, applying heat to a thermohardening glue that is between the fluid ejection module and the mounting frame, and curing the glue to secure the fluid ejection module to the mounting frame. The heat is applied with a heating element at least partially embedded in the glue.

This and other embodiments can optionally include one or more of the following features. The heat can be applied at a temperature of between about 150° C. and 250° C. The temperature can be between about 160° C. and 200° C. The heat can be applied for between about 1 and 10 minutes, such as about 5 minutes. The method can further embedding a first portion of the heating element in the glue and not a second portion. The method can further include removing at least some of the second portion of the heating element after curing. The fluid ejection module can include a die having nozzles formed in a surface, and positioning can include adjusting the wing structure such that it is substantially parallel with a surface of the die. Curing the glue can occur while maintaining the mounting frame at about room temperature. Applying heat to the glue can include applying a current to the heating element. The heating element can include a flexible circuit. The glue can include epoxy.

Certain implementations may have one or more of the following advantages. Applying heat to thermohardening glue located between a fluid ejection module and wings using a heating element at least partially embedded in the glue allows the glue to cure without heating the entire fluid ejector. Curing the thermohardening glue without heating the fluid ejector can be faster than heating the entire fluid ejector and avoids warping of materials in the fluid ejector that can occur during heating. Avoiding warping of the fluid ejector can improve alignment. Improving alignment can result in greater consistency and accuracy in fluid droplet ejection.

The details of one or more embodiments are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

During fluid droplet ejection, misalignment of the fluid ejectors can cause inaccuracies in droplet ejecting. Without being limited to any particular theory, one cause of misalignment is warping of components caused by heating. Alignment can be improved by embedding a heater in a thermohardening glue, such as an epoxy, which is between the mounting frame and the fluid ejection module of each fluid ejector. The thermohardening glue is then cured by just heating the heating element and the glue without heating the entire structure.

Figure 1A:
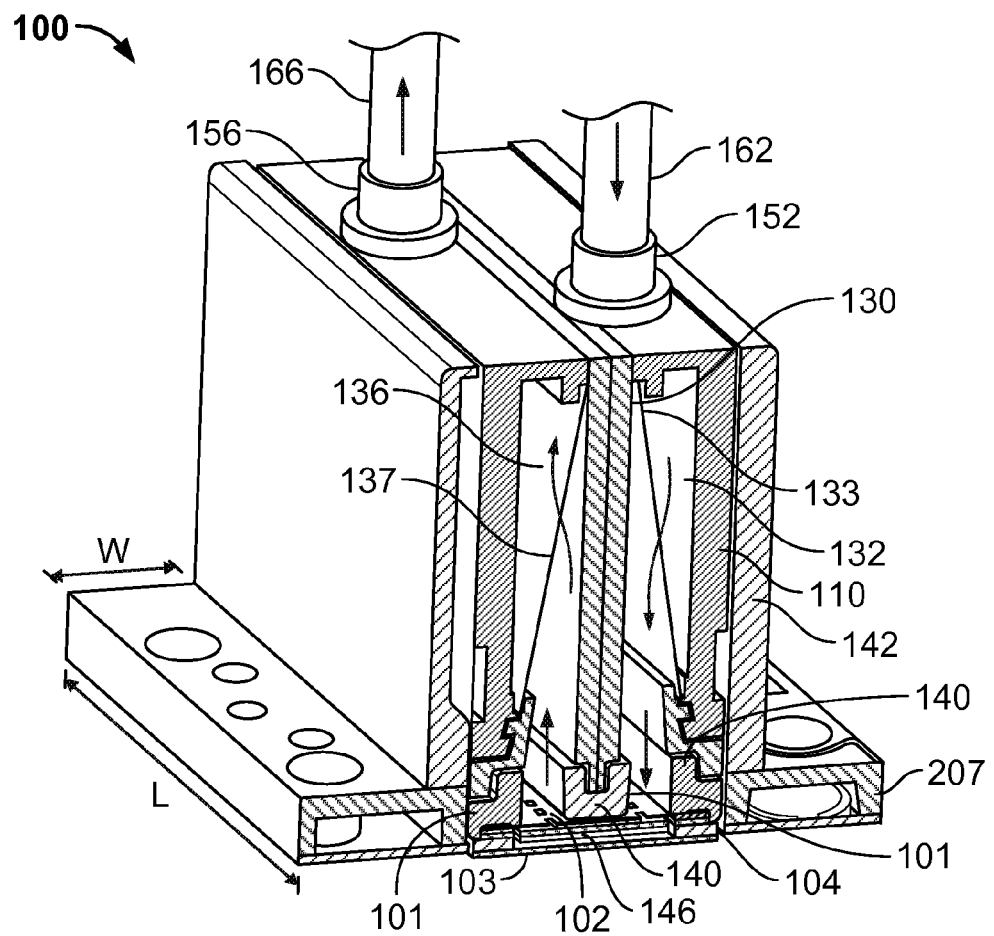
FIG. 1A is a perspective cross sectional view of an exemplary fluid ejector.

Referring to FIG. 1A, an implementation of a fluid ejector 100 includes a die 103. The die 103 can be formed, for example, of silicon, and can be fabricated using semiconductor processing techniques. A plurality of fluid paths are formed in the die 103, and a plurality of actuators are configured to individually control ejection of fluid from nozzles of the fluid paths. The fluid ejector can further include a die cap 140 configured to seal a cavity in the fluid ejector and to provide a bonding area for components of the fluid ejector that are used in conjunction with the die 103. The die cap 140 can be formed, for example, of a plastic such as liquid crystal polymer (LCP). The die 103 and die cap 140 can together be called a fluid ejection module.

The fluid ejector 100 can include an outer housing 142 and an inner housing 110. The outer housing 142 and inner housing 110 are configured to support the die 103 and connect the fluid ejector 100 to a print bar. The outer housing 142 can be attached to the inner housing 110 such that a cavity is created between the two. The inner housing 110 can be divided by a dividing wall 130 to provide an inlet chamber 132 and an outlet chamber 136 for fluid. Each chamber 132 and 136 can include a filter 133 and 137. Tubing 162 and 166 that carries the fluid can be connected to the chambers 132 and 136, respectively, through apertures 152, 156. The dividing wall 130 can be held by a the die cap 140 that sits on an interposer assembly 146 above the die 103. Fluid inlets and fluid outlets 102 through the fluid ejector 100 can allow fluid to circulate from the inlet chamber 132, through the die 103, and into the outlet chamber 136.

The fluid ejector 100 can include a mounting frame or wings 207 extending along each side of the die 103. The length L, i.e. longest side, of the wings 207 can extend along the length of the die 103. Moreover, the width W of the wings 207 can be perpendicular to the outer housing 142 such that the outer housing 142 and wings 207 together form two L-shaped parts on either side of the die 103. The wings 207 can be made of a plastic material, such as liquid crystal polymer (LCP). The die 103 can sit between the two wings 207.

Figure 1B:
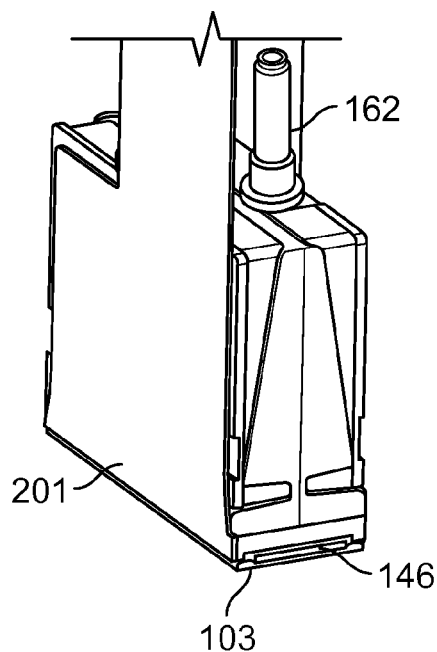
FIG. 1B is a perspective cross sectional view of an exemplary fluid ejector that illustrates the placement of the flex circuit in the housed fluid ejector.

Referring to FIG. 1B, the wings and outer housing are removed to show that the fluid ejector 100 includes a flexible printed circuit or flex circuit 201. The flexible circuit 201 can be formed, for example, on a plastic substrate. The flexible circuit 201 is configured to electrically connect the fluid ejector 100 to a printer system or computer (not shown). The flexible circuit 201 can be used to transmit data, such as image data and timing signals, from an external process of the print system, to the die 103 for driving fluid ejection elements, e.g. the actuators. The flexible circuit 201 can be bonded to the fluid ejector and can extend along a height of the inner housing 110.

Figure 2:
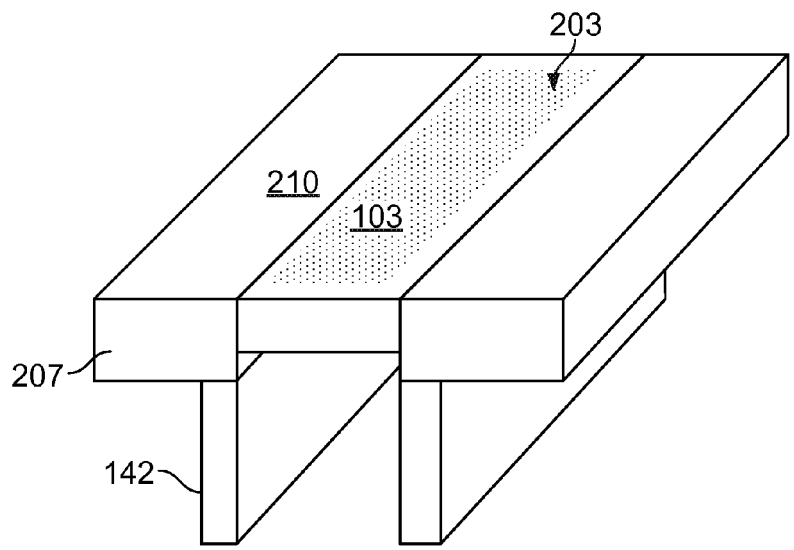
FIG. 2 is a perspective view of the bottom of an exemplary fluid ejector.
Figure 3:
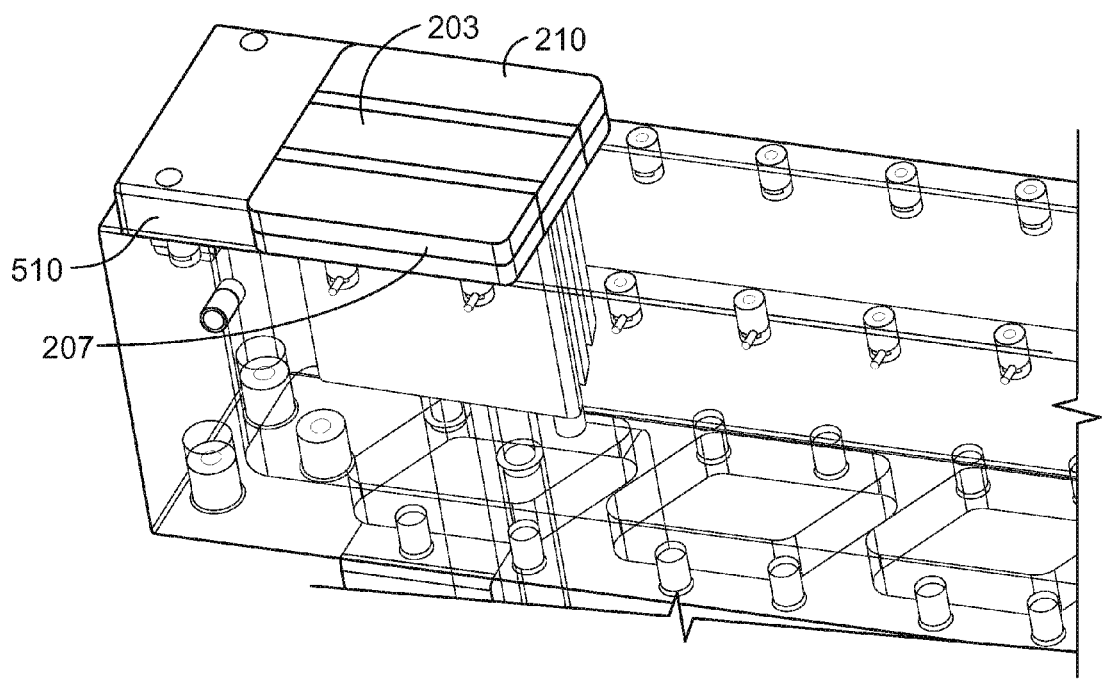
FIG. 3 is a perspective view of the bottom of an exemplary fluid ejector attached to a print bar.

Referring to FIG. 2, the bottom surface of the die 103, which includes nozzles 203, extends about parallel with the bottom surface of the wings 207 (only a portion of the fluid ejector is shown for the sake of simplicity). For example, the bottom surface of the die 103 can be co-planar with the bottom surface of the wings 207 to within 100 µm. Referring to FIG. 3, the wings 207 can be attached to a print bar 510. Multiple similar fluid ejectors (not shown) can be fit into the print bar 510 to form a fluid ejection system. The plurality of fluid ejectors within the print bar 510 can be aligned such that the bottom surface 210 of the wings are all coplanar within 20 µm. Further, all of the fluid ejectors can be coplanar with one another to within 50 µm.

Figure 4:
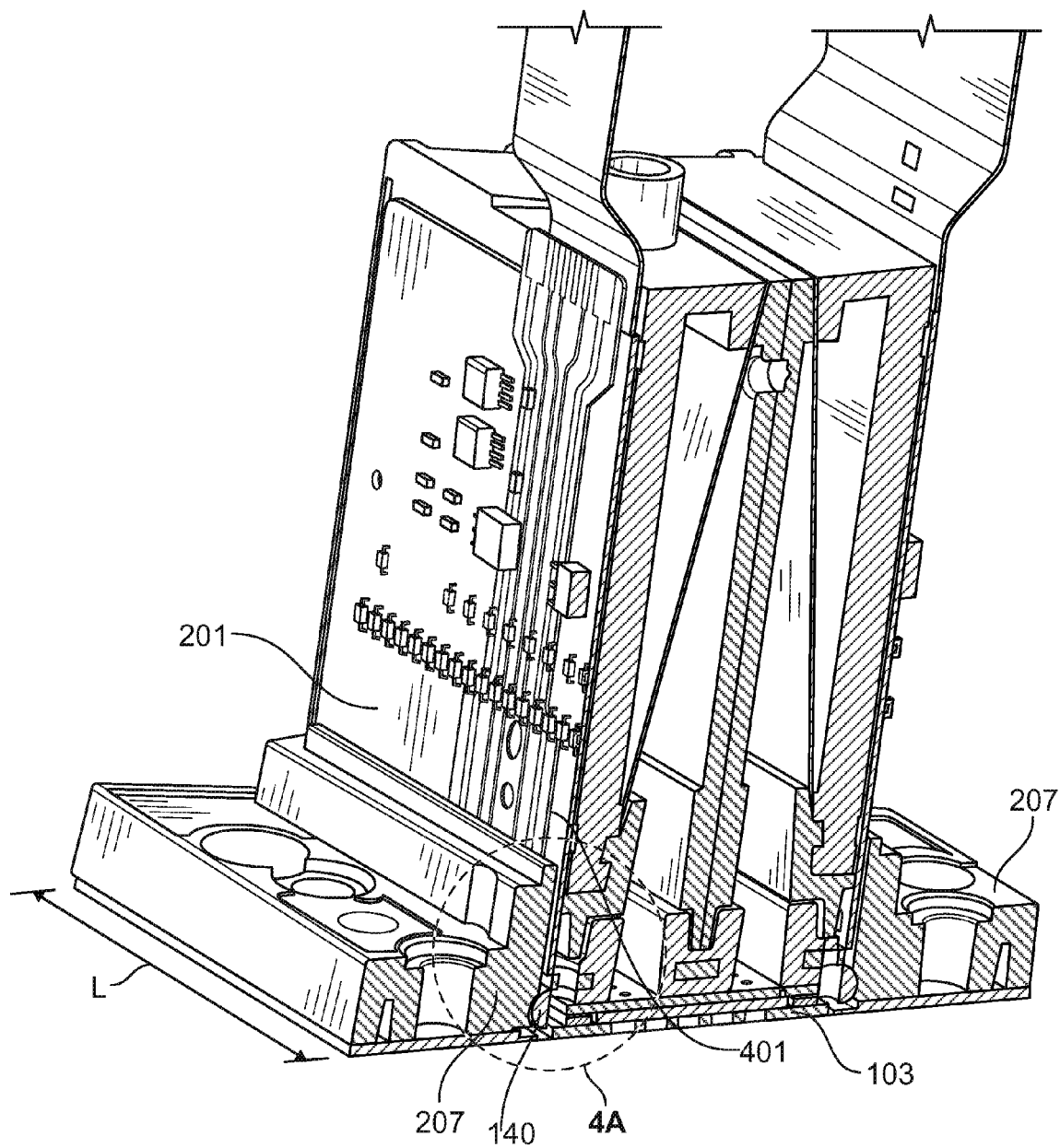
FIG. 4 is a peeled perspective view of an exemplary fluid ejector having a heating element.
Figure 4A:
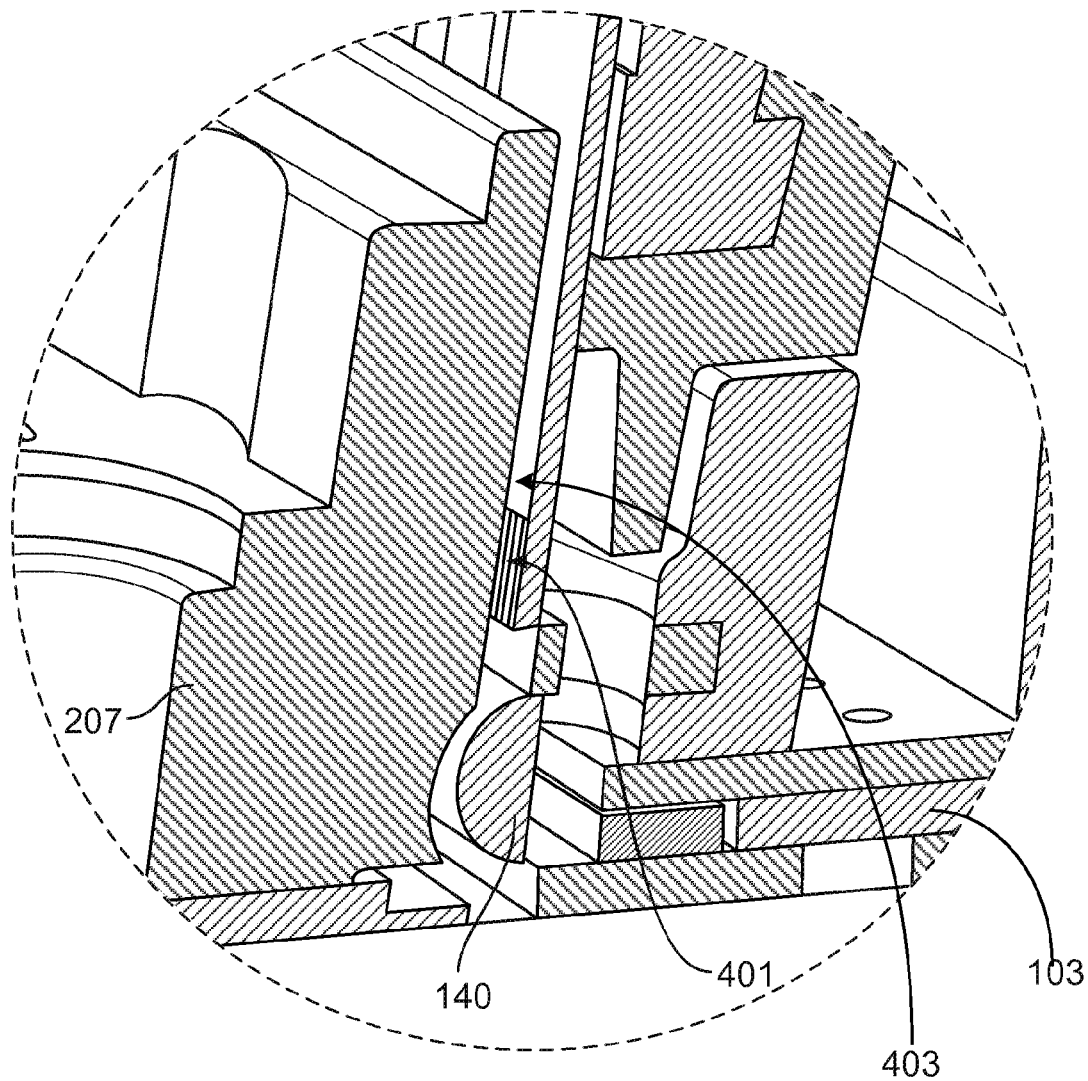
FIG. 4A is an expanded view of a portion of FIG. 4.
Figure 5:
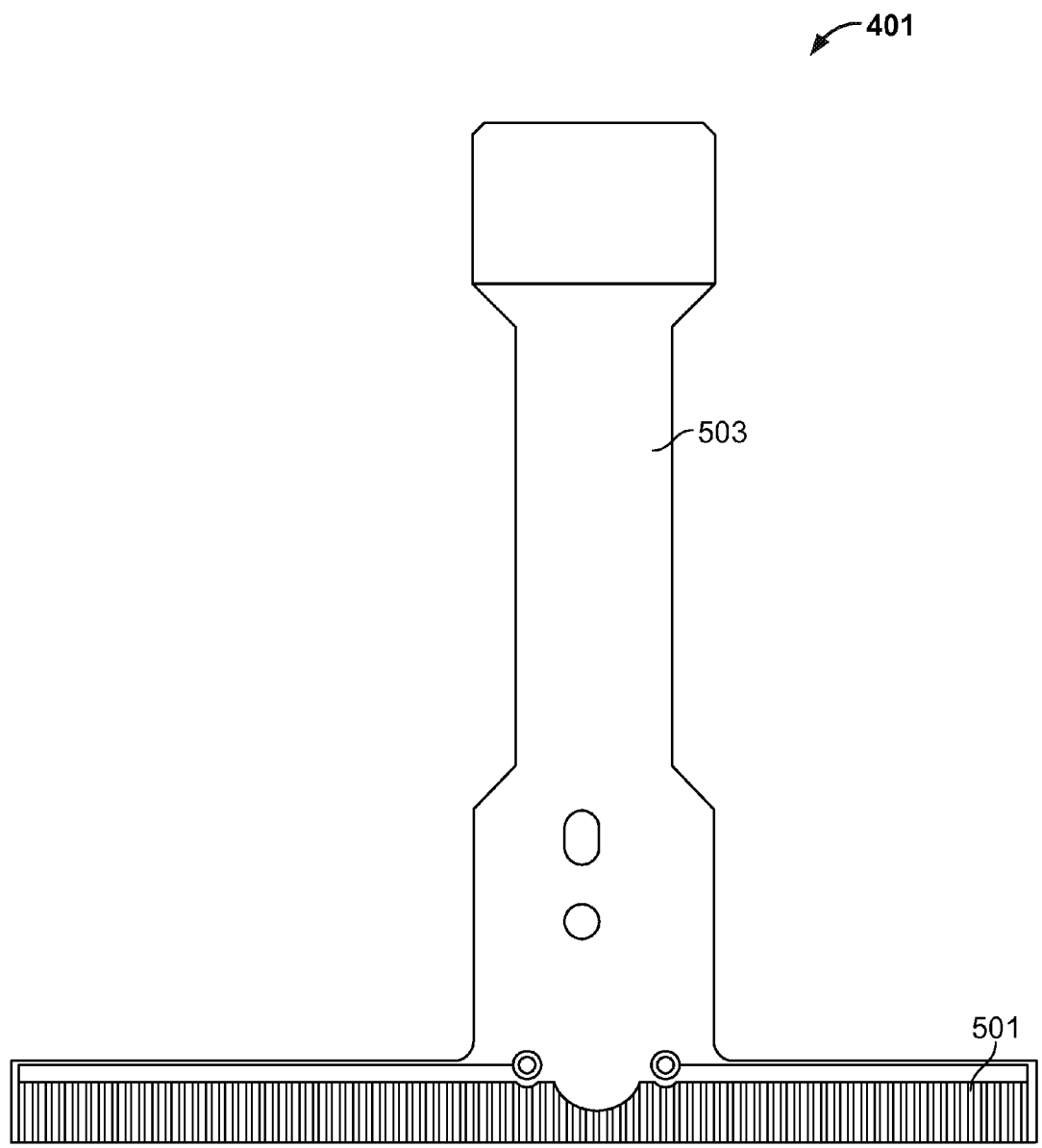
FIG. 5 is a side view of an exemplary heating element.

Referring to FIGS. 4, 4A, and 5, a heating element 401 extends between the outer housing 142 and the fluid ejection module, for example between the wings 207 and the die cap 140. As shown in FIGS. 4 and 4A, the heating element 401 can be adjacent to, or extend parallel with, the flexible circuit 201. The heating element can be less than about 100µ to 200µ thick such that its effect on the overall width of the fluid ejector 100 is minimal. The heating element 401 can be at least partially embedded in a thermohardening glue (not shown), such as epoxy, located in a gap 403 between the wings 207 and the fluid ejection module. Although the thermohardening glue does not necessarily contact fluid in the die, the glue can be chosen such that it is resistant to etching by fluid flowing through or leaking from the fluid ejector.

The heating element 401 can have a lower portion 501 and an upper portion 503. The lower portion 501 and the upper portion 503 can be perpendicular to one another, e.g. to form a T-shape or an L-shape. The lower portion 501 can run a length L of the die 103, and the upper portion can extend up the length of the fluid ejector 100. In some implementations, only the lower portion is embedded in the thermohardening glue. The lower portion can include wires configured to heat when a current is applied through the heating element 401. The lower portion can further include a temperature sensing device, such as a thermistor, to enhance process control in manufacturing.

The heating element 401 can comprise a flexible circuit, i.e. an electronic device mounted on a flexible plastic substrate, such as polyimide. The flexible circuit can be configured such that, when exposed to current, it is capable of heating the thermohardening glue to over 150° C., such as between 150° C. and 250° C.

A process for making the fluid ejector 100 includes fabricating the fluid ejection module by attaching the die cap 140 to the die 103. The flexible circuit can be attached to the die 103 and die cap 140. Further, the heater 401 can be prefabricated by applying uncured glue to a first side of the heater 401 and attaching it to a wing 207, for example by using the heater to harden the glue. Uncured glue can then be applied to a second side of the heater, opposite to the first side. The wings 207 and the fluid ejection module having the flexible circuit attached can then be brought together, for example by placing both flat on a fixture and bring the wings toward the fluid ejection module and flexible circuit. The position of the fluid ejection module and/or wings 207 can be adjusted such that the surface of the die 103 having the nozzles is co-planar with the bottom surface of the wings 207 to within 100 µm.

A current can then be applied to the heating element 401 to heat the uncured thermohardening glue. The heat can be applied at a temperature of between about 150° C. and 250° C., such a between about 160° C. and 200° C. for between about 1 and 10 minutes, such as about 5 minutes. The heat can be applied until the thermohardening glue cures to attach the fluid ejection module and the flexible circuit to the wings 207. In some embodiments, the heater does not heat above 250° C. or for more than 10 minutes to avoid warping other parts of the fluid ejector. Thus, during the heating and curing, the fluid ejection module and outer housing 142 can remain unheated, e.g. can remain at about room temperature.

The heater 401 can be used to secure the position of the fluid ejector 100 between the wings 207. After curing, optionally a portion of the heater 401 is removed to leave a conductive element at least partially embedded in the thermohardening glue. The removal can be performed such that the conductive element is about even with the cured epoxy ends, i.e. is clipped right above the wings 207. Removing a portion of the fluid ejector after curing the glue prevents the heating element from mechanically interfering with any other components in the printing device. Following attachment of the wings 207 to the fluid ejection module and flexible circuit, the outer housing 142 can be attached.

By heating thermohardening glue, such as epoxy, between the fluid ejection module and wings using a heating element at least partially embedded in the thermohardening glue, the fluid ejection module, flexible circuit, and wings can remain unheated. Such a system avoids warping or stressing of various components of the fluid ejector, such as the plastic wings of the fluid ejector. As a result, alignment can be improved, resulting in better consistency and accuracy during fluid droplet ejection.

Particular embodiments have been described. Other embodiments are within the scope of the following claims.

What is claimed is:

1. A fluid ejector, comprising:
   a mounting frame;
   a fluid ejection module attached to the mounting frame, the fluid ejection module having a plurality of nozzles and a plurality of actuators; and
   a conductive heating element other than the plurality of actuators, the conductive heating element at least partially embedded in a thermohardened glue, wherein the glue secures the fluid ejection module to the mounting frame.

2. The fluid ejector of claim 1, wherein the fluid ejection module includes a die and a die cap adjacent to the die, and wherein the glue secures the die cap to the mounting frame.

3. The fluid ejector of claim 2, wherein the die comprises silicon.

4. The fluid ejector of claim 1, wherein the mounting frame comprises a wing structure.

5. The fluid ejector of claim 4, wherein the mounting frame has two wing structures, a first of which is adjacent to a first edge of the die and a second of which is adjacent to a second edge of the die opposite to the first edge.

6. The fluid ejector of claim 4, wherein the nozzles are formed in a surface of the die and the surface is substantially parallel with a surface of the wing structure.

7. The fluid ejector of claim 4, wherein the wing structure comprise plastic.

8. The fluid ejector of claim 4, wherein the wing structure is attached to a print bar.

9. The fluid ejector of claim 1, wherein the glue comprises an epoxy.

10. The fluid ejector of claim 1, further comprising a flexible element in electrical communication with the fluid ejection module such that an electrical connection of the fluid ejection module enables a signal to be sent from the flexible element to the fluid ejection module to cause fluid to be ejected from the nozzles.

11. The fluid ejector of claim 1, wherein a first portion of the conductive heating element extends along a length of the fluid ejection module.

12. The fluid ejector of claim 11, wherein a second portion of the conductive heating element extends along an entire height of the fluid ejector.

13. The fluid ejector of claim 1, wherein the conductive heating element is less than about 100μ to 200μ thick.

14. The fluid ejector of claim 1, wherein the thermohardened glue is located between the mounting frame and the fluid ejection module.

15. The fluid ejector of claim 14, wherein the conductive heating element is located between the mounting frame and the fluid ejection module.

16. The fluid ejector of claim 1, wherein the plurality of actuators comprise piezoelectric actuators.

17. A method of forming a fluid ejector, comprising:
    positioning a fluid ejection module such that it is adjacent to a mounting frame;
    applying heat to a thermohardening glue that is between the fluid ejection module and the mounting frame, wherein the heat is applied with a heating element at least partially embedded in the glue; and
    curing the glue with the heat from the heating element at least partially embedded in the glue to secure the fluid ejection module to the mounting frame.

18. The method of claim 17, wherein the heat is applied at a temperature of between about 150° C. and 250° C.

19. The method of claim 18, wherein the temperature is between about 160° C. and 200° C.

20. The method of claim 17, wherein the heat is applied for between about 1 and 10 minutes.

21. The method of claim 20, wherein the heat is applied for about 5 minutes.

22. The method of claim 17, further comprising embedding a first portion of the heating element in the glue and not a second portion.

23. The method of claim 22, further comprising removing at least some of the second portion of the heating element after curing.

24. The method of claim 17, wherein the fluid ejection module includes a die having nozzles formed in a surface, and wherein positioning includes adjusting the wing structure such that it is substantially parallel with a surface of the die.

25. The method of claim 17, wherein curing the glue occurs while maintaining the mounting frame at about room temperature.

26. The method of claim 17, wherein applying heat to the glue includes applying a current to the heating element.

27. The method of claim 17, wherein the heating element comprises a flexible circuit.

28. The method of claim 17, wherein the glue comprises epoxy.

29. The method of claim 17, wherein the fluid ejection module includes a plurality of nozzles and a plurality of actuators, and wherein the heating element at least partially embedded in the glue is other than the plurality of actuators.

* * * * *

UNITED STATES PATENT AND TRADEMARK OFFICE
CERTIFICATE OF CORRECTION

| | | |
|---|---|---|
| PATENT NO. | : 8,240,817 B2 | Page 1 of 1 |
| APPLICATION NO. | : 12/616108 | |
| DATED | : August 14, 2012 | |
| INVENTOR(S) | : Steve Deming | |

It is certified that error appears in the above-identified patent and that said Letters Patent is hereby corrected as shown below:

In Claim 13 at Column 5, Line 52 delete "100μto 200μthick." and insert -- 100μm to 200μm thick. --, therefor.

Signed and Sealed this

Thirteenth Day of November, 2012

David J. Kappos
*Director of the United States Patent and Trademark Office*